(12) United States Patent
Jansson (10) Patent No.: US 11,976,978 B2
(45) Date of Patent: May 7, 2024

(54) DETERMINATION OF RISK LEVEL FOR PARTICLES

(71) Applicant: Firefly AB, Stockholm (SE)

(72) Inventor: Lennart Jansson, Värmdö (SE)

(73) Assignee: Firefly AB, Stockholm (SE)

( * ) Notice: Subject to any disclaimer, the term of this patent is extended or adjusted under 35 U.S.C. 154(b) by 863 days.

(21) Appl. No.: 16/971,557

(22) PCT Filed: Jan. 21, 2019

(86) PCT No.: PCT/EP2019/051360
§ 371 (c)(1),
(2) Date: Aug. 20, 2020

(87) PCT Pub. No.: WO2019/162008
PCT Pub. Date: Aug. 29, 2019

(65) Prior Publication Data
US 2020/0400505 A1 Dec. 24, 2020

(30) Foreign Application Priority Data
Feb. 23, 2018 (SE) .................. 1850206-2

(51) Int. Cl.
*G01J 5/00* (2022.01)
*G01J 5/60* (2006.01)
*G08B 17/12* (2006.01)

(52) U.S. Cl.
CPC .......... *G01J 5/0066* (2013.01); *G01J 5/602* (2013.01); *G08B 17/12* (2013.01); *G01J 5/0014* (2013.01); *G01J 5/0022* (2013.01)

(58) Field of Classification Search
CPC ........ G01J 5/0066; G01J 5/602; G01J 5/0014; G01J 5/0022; G08B 17/12; A62C 3/04
See application file for complete search history.

(56) References Cited

U.S. PATENT DOCUMENTS 3,824,392 A 7/1974 Tibbling
4,142,417 A 3/1979 Cashdollar et al.
(Continued)

FOREIGN PATENT DOCUMENTS

| EP | 2881719 A1 | 6/2015 |
|----|------------|--------|
| JP | H09504714 A * | 5/1997 |
| WO | WO-00/39769 A1 | 7/2000 |

OTHER PUBLICATIONS

Amyotte, Paul R. et al., "Dust explosion causation, prevention and mitigation: An overview," Journal of Chemical Health & Safety, Elsevier, Amsterdam, NL, vol. 17, No. 1, Jan. 1, 2010, pp. 15-28.

*Primary Examiner* — Brandi N Hopkins
*Assistant Examiner* — Janice M Soto
(74) *Attorney, Agent, or Firm* — Faegre Drinker Biddle & Reath LLP (57) ABSTRACT

A system for determining a risk level for particles moving along a path. —The system includes a sensor arrangement including at least one set of sensing elements including at least two sensing elements arranged to co-operate with mutually separated sensing zones along the path of movement of the particles to detect a signal related to temperature of the particles. The system further includes a processing device arranged to: receive signals from the sensor arrangement; form signals from the sensing elements into a pulse train when a particle moves through field-of-view of the sensor arrangement; based on the pulse train, determine a risk level for the particles; and adapt at least one parameter used in the determination of the risk level based on at least one property of the particles moving along the path of movement from the first position to the second position.

14 Claims, 6 Drawing Sheets

(56) References Cited

U.S. PATENT DOCUMENTS

| | | |
|---|---|---|
| 5,740,867 A | 4/1998 | Jansson |
| 5,749,420 A | 5/1998 | Jansson |
| 6,732,810 B1 | 5/2004 | Jansson |

\* cited by examiner

EXPLOSION CHARACTERISTICS OF VARIOUS DUSTS

| TYPE OF DUST | EXPLOSI-BILITY INDEX | IGNITION SENSI-TIVITY | EXPLO-SION SEVERITY | MAXIMUM EXPLOSION PRESSURE Bar* | MAX RATE OF PRESSURE RISE Bar/sec* | IGNITION TEMPERATURE | | MIN CLOUD IGNITION ENERGY, J | MIN EXPLOSION CONC GRAM/m³ |
|---|---|---|---|---|---|---|---|---|---|
| | | | | | | CLOUD °C | LAYER °C | | |
| CELLULOSE | 2.8 | 1.0 | 2.8 | 8.96 | 310 | 480 | 270 | 0.080 | 55 |
| CELLULOSE, ALPHA | >10 | 2.7 | 4.0 | 8.07 | 552 | 410 | 300 | 0.040 | 45 |
| COCOA, NATURAL 19% FAT | 0.6 | 0.5 | 1.1 | 4.69 | 83 | 510 | 240 | 0.10 | 75 |
| COFFE, FULLY ROASTED | <0.1 | 0.2 | 0.1 | 2.62 | 10 | 720 | 270 | 0.16 | 85 |
| CORN | 6.9 | 2.3 | 3.0 | 7.79 | 414 | 400 | 250 | 0.04 | 55 |
| CORNSTARCH COMMERCIAL PRODUCT | 9.5 | 2.8 | 3.4 | 7.31 | 517 | 400 | - | 0.04 | 45 |
| CORK DUST | >10 | 3.6 | 3.3 | 6.62 | 517 | 460 | 210 | 0.035 | 35 |
| COTTON LINTER, RAW | <0.1 | <0.1 | <0.1 | 5.03 | 28 | 520 | - | 1.92 | 501 |
| CUBE ROOT, SOUTH AMERICAN | 6.5 | 2.7 | 2.4 | 4.76 | 145 | 470 | 230 | 0.04 | 40 |
| GRAIN DUST, WINTER WHEAT, CORN, OATS | 9.2 | 2.8 | 3.3 | 9.03 | 483 | 430 | 230 | 0.03 | 55 |
| LYCOPODIUM | 16.4 | 4.2 | 3.9 | 5.17 | 214 | 480 | 310 | 0.04 | 25 |
| MILK, SKIMMED | 1.4 | 1.6 | 0.9 | 6.55 | 159 | 490 | 200 | 0.05 | 50 |
| RICE | 0.3 | 0.5 | 0.5 | 4.09 | 48 | 510 | 450 | 0.10 | 85 |
| SOY FLOUR | 0.7 | 0.6 | 1.1 | 6.48 | 55 | 550 | 340 | 0.10 | 60 |
| SUGAR, POWDERED | 9.6 | 4.0 | 2.4 | 7.52 | 345 | 370 | 400 | 0.03 | 45 |
| WHEAT FLOUR | 4.1 | 1.5 | 2.7 | 6.69 | 193 | 440 | 440 | 0.06 | 50 |
| WHEAT STARCH, EDIBLE | 17.7 | 5.2 | 3.4 | 6.90 | 448 | 430 | - | 0.025 | 45 |
| WOOD FLOUR, WHITE PINE | 9.9 | 3.1 | 3.2 | 7.79 | 379 | 470 | 260 | 0.040 | 35 |

Compiled from the following reports of the U.S. Department of Interior, Bureau of Mines: RI 5753, The Explosibility of Agricultural Dusts; RI 6516, Explosibility of Metal Powders; RI 5971, Explosibility of Dusts used in the Plastics Industry; RI 6597, Explosibility of Carbonaceous Dusts; RI 7132, Dust Explosibility of Chemicals, Drugs, Dyes and Pesticides; and RI 7208, Explosibility of Miscellaneous Dusts.

DETERMINATION OF RISK LEVEL FOR PARTICLES

CROSS-REFERENCE TO PRIOR APPLICATIONS

This application is a § 371 National Stage Application of PCT International Application No. PCT/EP2019/051360 filed Jan. 21, 2019, which claims priority to Swedish Application No. 1850206-2 filed on Feb. 23, 2018, both of which are incorporated herein in their entirety.

TECHNICAL FIELD

The present disclosure relates generally to systems and methods for determining a risk level for particles moving along a path of movement from a first position to a second position.

BACKGROUND

Masses of particles may be moved around in different types of production facilities, such as e.g. process plants, e.g. in connection with the pneumatic transport of particles. The material is often loosely formed and transported by a gas or in a gas or gaseous mixture, such as air, in which the material particles are mutually discrete. The material particles may e.g. be extremely fine, dust-like particles, powdery material, granular particles, wood chips, pellets or straw. The process plants may e.g. be recycling plants, sawmills, or different types of production plants, for e.g. various types of food, diapers, pulp or paper. Particles may before or during such transport become so heated that they will form hot particles, glowing embers or sparks, which may initiate fire or explosion in a risk zone. If burning or glowing particles can be detected, the risk area can be isolated, or firefighting or choking means can be supplied, prior to the initiation of a fire or explosion.

U.S. Pat. No. 3,824,392 describes a transducer that may be used to detect burning or glowing particles in connection with the transport of particles. The transducer has at least two mutually separated sensing zones, in which light-sensitive sensing elements co-operating with each zone receive light during the movement of a light-emitting particle, such as a spark or a fire flake, through the field-of-view of the transducer. The signal sent from the transducer when a light-emitting particle passes the transducer will thus be in the form of a pulse train. This eliminates false alarms due to light changes caused by e.g. the switching on of lamps. When a burning or glowing particle is detected, the process may be interrupted, or fire eliminating means may be supplied.

U.S. Pat. No. 5,740,867 describes a preventive safety system which can be applied in a process in which loosely formed material is produced in a first unit and transported, through an indicating zone and an extinguishing zone, to a second unit. If a hazardous high-temperature particle is detected in the indicating zone, an extinguishing agent may e.g. be delivered in the extinguishing zone.

U.S. Pat. No. 5,749,420 describes a preventive safety system which can be applied in a process in which loosely formed material is produced in a first unit and transported to a second unit, and in which the sensed intensity is used to calculate the liability of a particle to initiate fire and/or explosion.

Problems with the Prior Art

The risk level in a system transporting particles depends on both the temperature and the energy content of the particles. Prior art systems determine this risk level by measuring the signal strength for a detector that captures heat generated radiation. The signal strength for such a detector depends on both the temperature and the energy content of the particle. In prior art systems, this signal strength is compared to a threshold, giving the general output "high risk" or "low risk", based on whether the signal strength is above or below the threshold.

However, different types of particles have different ignition temperatures and ignition energies. If the temperature is far below the ignition temperature for the specific particle, the risk may be low even if the energy content would be very high. Further, the ignition temperature and/or the ignition energy may also depend on other factors, such as e.g. the temperature and/or energy and/or moisture content of the surrounding particles (hot and dry particles e.g. ignite much more easily than cold and wet particles).

There is thus a need for an improved system for determining a risk level for particles.

SUMMARY

The above described problem is addressed by the claimed system for determining a risk level for particles moving along a path of movement from a first position to a second position. The system may comprise a sensor arrangement, a field-of-view of which is arranged in the path of movement of the particles to detect a signal related to the temperature of particles moving through said field-of-view. The sensor arrangement may comprise at least one set of sensing elements, each set comprising at least two sensing elements arranged to co-operate with mutually separated sensing zones along the path of movement of the particles. The system may further comprise at least one processing device, which is arranged to: receive signals from the sensor arrangement; form signals from the at least one set of sensing elements into at least one pulse train when a particle moves through the field-of-view of the sensor arrangement; and based on this at least one pulse train determine a risk level for the particles moving through the field-of-view of the sensor arrangement. The at least one processing device may further be arranged to adapt at least one parameter used in the determination of the risk level based on at least one property of the particles moving along the path of movement from the first position to the second position. Such a system allows for accurate determinations of the risk level for particles moving along a path of movement from a first position to a second position, since the risk level depends on the particle properties.

The above described problem is further addressed by the claimed method for determining a risk level for particles moving along a path of movement from a first position to a second position. The method may comprise: detecting a signal related to the temperature of particles moving through a field-of-view of a sensor arrangement, said field-of-view being arranged in the path of movement of the particles, the sensor arrangement comprising at least one set of sensing elements, each set comprising at least two sensing elements arranged to co-operate with mutually separated sensing zones along the path of movement of the particles; forming the signals from the at least one set of sensing elements into at least one pulse train when a particle moves through the field-of-view of the sensor arrangement; and determining a risk level for the particles moving through the field-of-view of the sensor arrangement based on this at least one pulse train. The method may further comprise adapting at least one parameter used in the determination of the risk level based on at least one property of the particles moving along the path of movement from the first position to the second position. Such a method allows for accurate determinations of the risk level for particles moving along a path of movement from a first position to a second position, since the risk level depends on the particle properties.

The at least one property of the particles may be any property of the particles. However, just the material of the particles is not normally in itself considered to be a particle property, since the particle properties for the same material differ depending on e.g. the size of the particles.

In embodiments, the at least on property of the particles is at least one of: the particle type of the particles, preferably including both particle material and particle size; purity/pollutions of the particle material; the amount of particles; the average temperature, energy content, and/or moisture content for the particles; the speed of movement of the particles; and/or the type of processing the particles have been subjected to before being moved along the path of movement from the first position to the second position. These properties may all have an effect on the risk level for the particles.

In embodiments, a temperature threshold is set based on the particle type, and possibly also the amount, of the particles moving along the path of movement from the first position to the second position, and the determining of the risk level involves determining a temperature relation to said set temperature threshold. The type of a particle is a way of describing different inherent aspects of the particle. The particle type depends on the material of the particle, but also on e.g. the size of the particle. Wood chips are e.g. considered to belong to a different particle type than sawdust, even though the wood chips may come from the same type of wood as the sawdust. The risk level may be different for different particle types. Further, the risk is generally lower when a lot of material moves than when there is a lower amount of particles.

In embodiments, a temperature and/or energy threshold is set based on the average temperature and/or energy content for the particles moving along the path of movement from the first position to the second position, and the determining of the risk level involves determining a temperature and/or energy relation to the set temperature and/or energy threshold. Particles which already are hot e.g. ignite much more easily than cold particles. In embodiments, the average temperature and/or energy content for the particles moving along the path of movement from the first position to the second position is determined as an average of the signals from the sensor arrangement for the particles moving through its field-of-view.

In embodiments, at least one of an upper and a lower speed threshold is set based on the speed of movement of the particles moving along the path of movement from the first position to the second position, and the determining of said risk level may involve removing signals from particles that move faster than the upper speed threshold and/or slower than the lower speed threshold. In this way, movements that are much too quick or slow to be particles may be ignored. This may be done e.g. using frequency filters.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 4 is a table showing the explosion characteristics of dusts of different particle types.

Embodiments of the present disclosure and their advantages are best understood by referring to the detailed description that follows. It should be appreciated that like reference numerals are used to identify like elements illustrated in one or more of the figures.

DETAILED DESCRIPTION

Different types of particles have different ignition temperatures and ignition energies. FIG. 4 is a table showing the explosion characteristics of dusts of different particle types. The ignition temperature for powdered sugar in cloud form is 370° C., while the ignition temperature for fully roasted coffee in cloud form is 720° C. The ignition temperatures of rice in cloud form (510° C.) and cotton linter in cloud form (520° C.) are rather similar, while the ignition energies are quite different (0.1 J for rice and 1.92 J for cotton linter). The prior art way of determining the risk level based on the signal strength of a detector that generally captures heat generated radiation (which depends on both the temperature and the energy content of the particle) may thus either give false alarms for cotton linter or fail to warn when the temperature of rice becomes dangerously high, even though the ignition temperatures are the same.

Further, the ignition energy may also depend on other factors, such as e.g. the temperature and/or energy and/or moisture content of the surrounding particles (hot and dry particles e.g. ignite much more easily than cold and wet particles). In order to determine the risk level in a system transporting a specific type of particle which has been subjected to a specific type of processing, it is thus advantageous to adapt the parameters used in the determination based on the properties of the particles. Such properties may e.g. be the type and amount of particle, purity/pollutions of the particle material, the temperature, energy and moisture content of the particles, the speed of movement of the particles and the type of processing the particles have been subjected to.

In order to determine a risk level for particles, it is advantageous to use a sensor arrangement that can detect temperature differences. Since an easy way of differentiating radiation emitted from the moving particles from ambient radiation is to use a sensor arrangement comprising a set of at least two sensing elements arranged to co-operate with mutually separated sensing zones along the path of movement of the particles, as described in U.S. Pat. No. 3,824, 392, a number of such sets of sensing elements, each set comprising sensing elements which detect radiation of wavelengths within a certain wavelength range, may be used to monitor the temperature of the particles. The wavelength relation between the signal strengths of signals detected by the sets of sensing elements will determine the temperature, since a body at a certain temperature emits radiation with a certain wavelength distribution, based on Planck's Law of Radiation.

Figure 5:
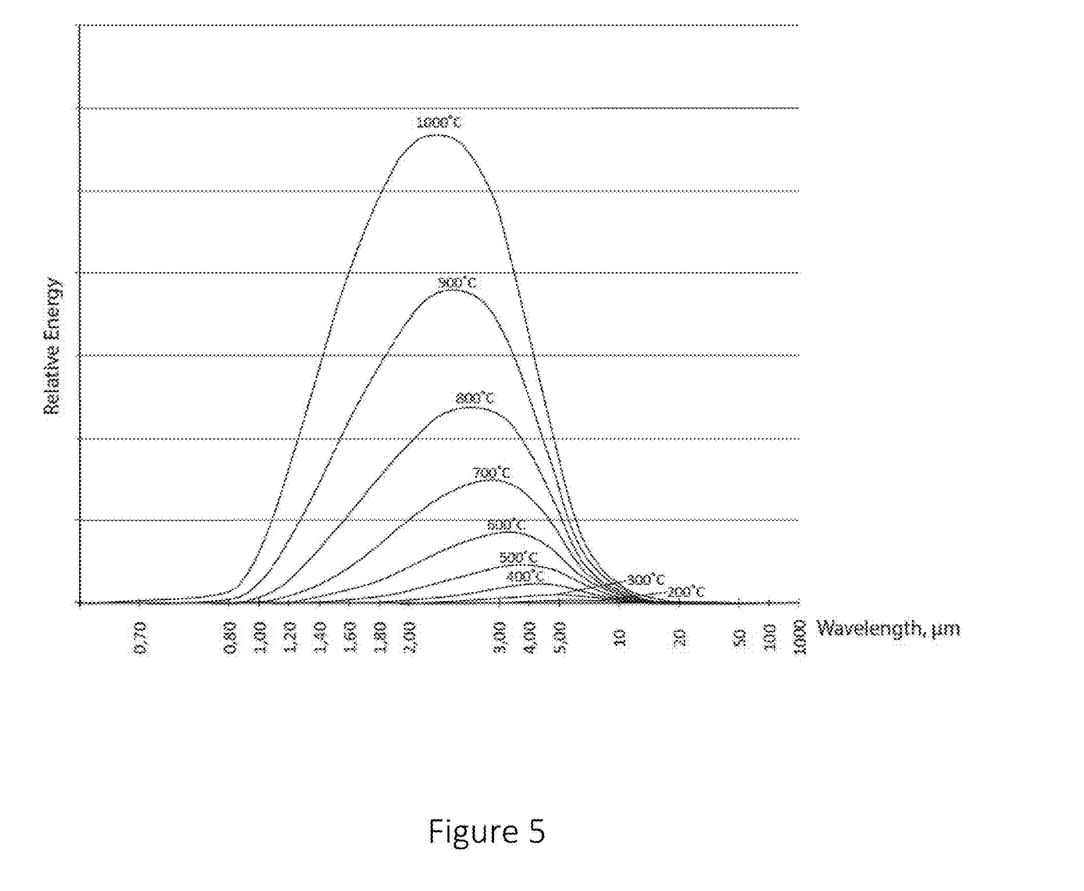
FIG. 5 illustrates the optical radiation over different temperatures for a suitable sensing element.

FIG. 5 illustrates the optical radiation over different temperatures for a typical particle. It can be seen in FIG. 5 that if the relation between the signal strengths from the different sets of sensing elements, each of which detect radiation of wavelengths within a certain wavelength range, is e.g. linear, with the signal strength increasing slightly at longer wavelengths, the temperature is relatively low. If instead the signal strength e.g. has a peak at a certain wavelength, and decreases at higher wavelengths, the temperature is high.

It may not be necessary to actually determine the temperature based on these wavelength relations, as long as the temperature relation to a temperature threshold for the particle type can be determined. This may e.g. be done by first estimating the wavelength relation for the temperature threshold, and then determining how close the wavelength relation between the signal strengths from the sensing elements is to the estimated wavelength relation. In this way, the detection may be adapted to the situation, so that alarms are given or alerts are set only in situations that are critical for the specific particle type.

The material of the particles is not normally in itself considered to be a particle property, since the particle properties for the same material differ depending on e.g. the size of the particles. The type of a particle is a way of describing different inherent aspects of the particle. The particle type depends on the material of the particle, but also on e.g. the size of the particle. Wood chips are e.g. considered to belong to a different particle type than sawdust, even though the wood chips may come from the same type of wood as the sawdust. Also various treatments to the particles way affect the particle type. Fully roasted coffee is e.g. considered as a different particle type than plain coffee beans. Various coverings on the particles may affect both the ignition temperature and the ignition energy.

In some situations, not all particles are of the same particle type. During the transport of one particle type along a path of movement from a first position to a second position, other particle types may also be transported, generally in the form of contaminations. For example, hot metal flakes may have been sheared from process equipment during a process stage before the transport of the particles. Since it is especially the risk that such metal flakes ignite the surrounding particles that needs to be avoided, the temperature of the metal flakes should be compared with the ignition temperature of the surrounding particles, not with the ignition temperature of the metal in question.

The present disclosure relates generally to systems and methods for determining a risk level for particles moving along a path of movement from a first position to a second position. The movement of the particles along the path of movement from the first position to the second position may be effected in many different ways, such as using pneumatic transport (suction or blow), pressing or simply letting the particles fall using gravity (if there is a vertical difference between the first position and the second position). Embodiments of the disclosed solution are presented in more detail in connection with the figures.

Figure 1:
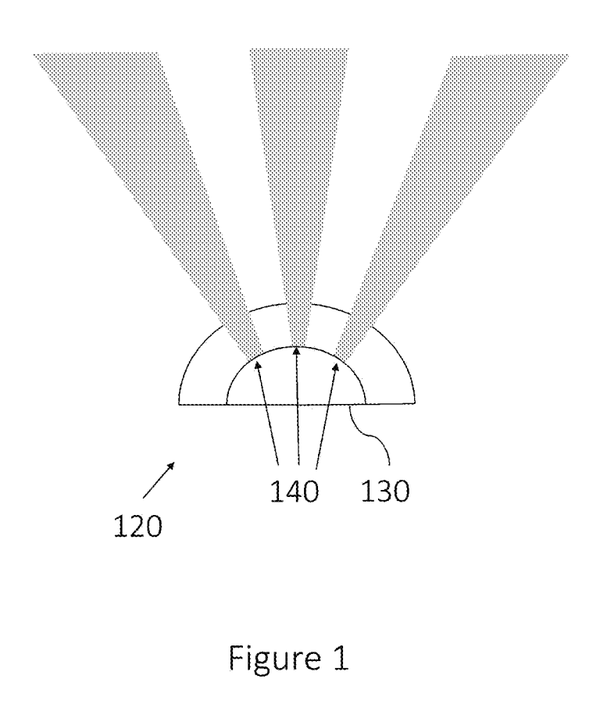
FIG. 1 schematically illustrates a sensor arrangement, in accordance with one or more embodiments described herein.

FIG. 1 schematically illustrates a sensor arrangement 120, in accordance with one or more embodiments described herein. The sensor arrangement 120 shown in FIG. 1 comprises three mutually separated sensing zones, and a set of three sensing elements 140, each arranged to co-operate with one of the sensing zones. There may also be further sets of sensing elements 140, each of which detecting radiation of wavelengths within a certain wavelength range, arranged to co-operate with the same sensing zones. For example, if there are three sets of sensing elements, there may be three sensing elements 140, one from each set of sensing elements, arranged to co-operate with each sensing zone.

Figure 2:
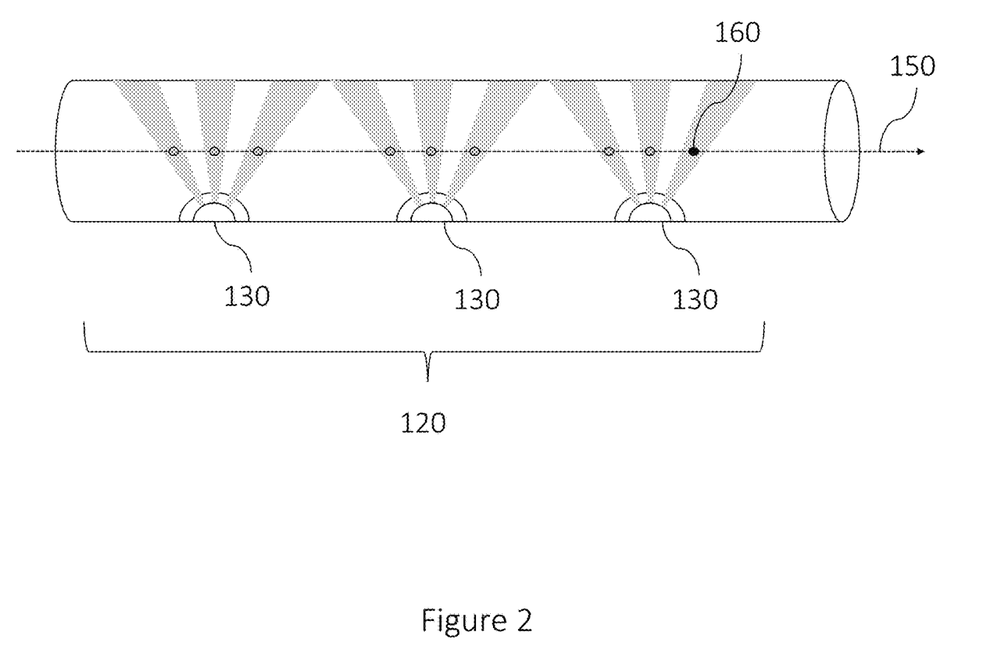
FIG. 2 schematically illustrates a sensor arrangement, in accordance with one or more embodiments described herein.

FIG. 2 schematically illustrates a sensor arrangement 120, in accordance with one or more embodiments described herein. Each set of sensing elements 140 in the sensor arrangement 120 may be arranged in a sensor 130, and the sensor arrangement 120 may comprise any number of sensors 130, each of which detecting radiation of wavelengths within a certain wavelength range. Each of the three sensors 130 shown in FIG. 2 comprises a set of three sensing elements 140, where the three sensing elements 140 of each set are arranged to co-operate with three mutually separated sensing zones along the path 150 of movement of the particles 160. The sensor arrangement 120 may be arranged to detect a signal related to the temperature of particles 160 moving in front of it and through its field-of-view, preferably with a sensing angle of up to 180 degrees. The at least one processing device 180 may be arranged to receive signals from each sensor 130 and form the signals from each set of sensing elements 140 into a pulse train.

Figure 3:
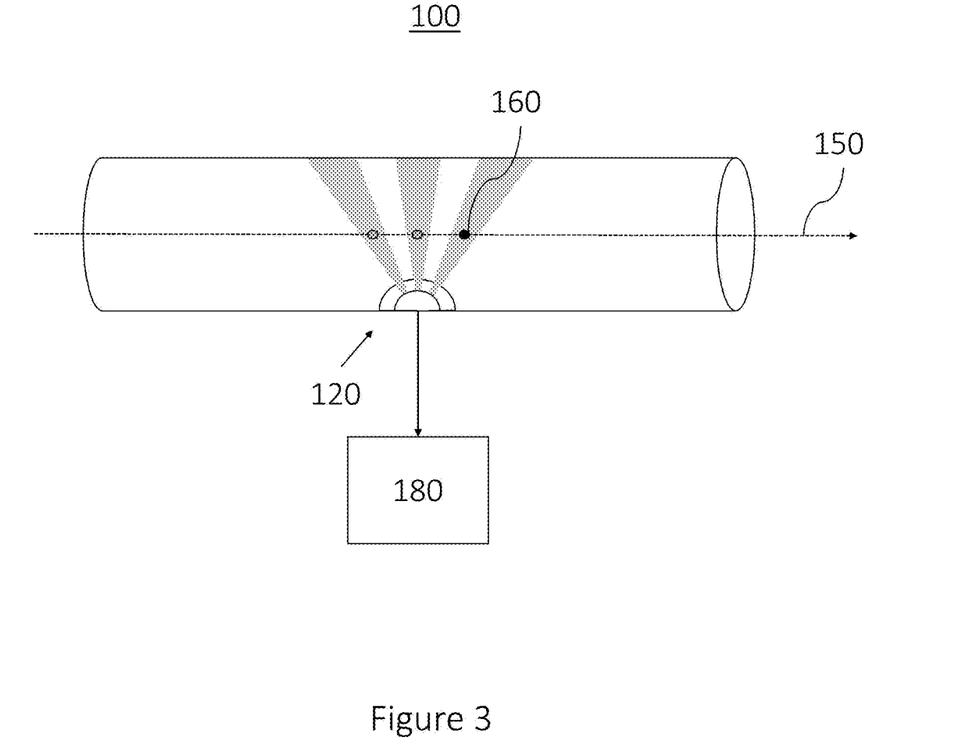
FIG. 3 schematically illustrates a system for determining a risk level for particles moving along a path of movement from a first position to a second position, in accordance with one or more embodiments described herein.

FIG. 3 schematically illustrates a system 100 for determining a risk level for particles 160 moving along a path 150 of movement from a first position to a second position, in accordance with one or more embodiments described herein. The system 100 comprises a sensor arrangement 120, a field-of-view of which is arranged in the path 150 of movement of particles 160 moving through said field-of-view, and at least one processing device 180. The sensor arrangement 120 may be arranged to detect a signal related to the temperature of particles 160 moving in front of it and through its field-of-view. The sensor arrangement 120 shown in FIG. 3 comprises at least one set of sensing elements 140, each set comprising three sensing elements 140 arranged to co-operate with three mutually separated sensing zones along the path 150 of movement of the particles 160.

The sensor arrangement 120 shown in FIGS. 1-3 is arranged in a path 150 of movement of the particles 160, but the sensor arrangement 120 may also, or alternatively, be arranged next to a path 150 of movement of the particles 160, as long as the field-of-view of the sensor arrangement 120 is arranged in a path 150 of movement of the particles 160. The path 150 of movement is in FIG. 1-3 shown as being horizontal, but it may have any orientation. If the particles 160 are intended to fall pass the sensor arrangement 120 using gravity, a vertical orientation may be preferred.

The sensing elements 140 are preferably sensing elements that have a clear temperature dependent response in a temperature range covering the ignition temperatures of the particles 160 moving along a path 150 of movement from a first position to a second position. Such sensing elements are e.g. lead sulphide cells, which are preferably used to detect radiation in wavelengths between 1 and 3 $\mu$m. As can be seen in FIG. 5, the shape of the temperature curve is significantly different for different temperatures in this wavelength range, in a temperature range covering the ignition temperatures of many common particles, as listed in the table of FIG. 4.

The at least one processing device 180 may be arranged to receive signals from the sensor arrangement 120 and form the signals from the at least one set of sensing elements 140 into at least one pulse train. Based on this at least one pulse train, the at least one processing device 180 may then determine a risk level for particles 160 moving through the field-of-view of the sensor arrangement 120.

The sensor arrangement 120 shown in FIG. 1 comprises one sensor 130 comprising three mutually separated sensing zones along the path 150 of movement of the particles 160, and three sensing elements 140, each co-operating with one of the sensing zones.

An easy way of accurately determining a risk level for particles 160 moving along a path 150 of movement from a first position to a second position is to include several sets of sensing elements 140, each set comprising sensing elements 140 that detect radiation of wavelengths within a certain wavelength range, in the sensor arrangement 120. The radiation wavelengths that the sensing elements 140 are sensitive to may depend on e.g. the material of the sensing elements 140.

FIG. 2 shows three sets of sensing elements 140, each set arranged in a sensor 130. The three sensors 130 shown in FIG. 2 are arranged beside each other along the path 150 of movement of the particles 160, which means that a particle 160 will pass one sensor 130 after the other. In such an arrangement, the signals from the sensors 130, i.e. the sets of sensing elements 140, will be phase shifted in relation to each other. If only one particle 160 at a time passes the sensor arrangement 120, the signals from the sets of sensing elements 140 may e.g. be correlated based on the phase shift. However, if many particles 160 pass the sensor arrangement 120 simultaneously, the sensor arrangement 120 will output an average value for the particles 160. In such a case the exact phase shift may be less important.

In an alternative embodiment, the sensors 130 are instead arranged in parallel along the path 150 of movement of the particles 160, so that a particle 160 passes all sensors 130, i.e. all sets of sensing elements 140, simultaneously. Combinations are also possible, so that groups of sensing elements 140 arranged in parallel are arranged beside each other along the path 150 of movement of the particles 160. It is e.g. possible to arrange a number of different sensing elements 140 in each sensing zone, so that the sensor arrangement 120 comprises at least two mutually separated sensing zones, where in each sensing zone a number of different sensing elements 140, each of which detecting radiation of wavelengths within a certain wavelength range, are arranged. Sensing elements 140 from more than one set of sensing elements may thus be arranged to co-operate with the same sensing zone. There may e.g. be a sensing element 140 from each set of sensing elements co-operating with each sensing zone.

The at least one processing device 180 may be arranged to adapt at least one parameter used in the determination of the risk level based on various properties of the particles 160. These properties may e.g. be the particle type of the particles 160, preferably including both particle material and particle size; purity/pollutions of the particle material; the amount of particles 160; the average temperature and/or energy content for the particles 160; the average moisture content for the particles 160; the speed of movement of the particles 160; and/or the type of processing the particles 160 have been subjected to before being moved along the path 150 of movement from the first position to the second position.

These properties may all have an effect on the risk level for the particles 160. The particle type may e.g. effect the ignition temperature and/or the ignition energy for the particles, since particles of different material, size, and/or coverings may e.g. have different ignition temperature and/or ignition energy. The adapting of at least one parameter may comprise setting a temperature threshold based on the particle type, and possibly also the amount, of the particles 160 moving along the path 150 of movement from the first position to the second position. The amount of particles 160 may also affect the risk level, since the risk is generally lower when a lot of material moves than when there is a lower amount of particles. The average temperature, energy content, and/or moisture content for the particles 160 may also affect the risk level, since particle which e.g. are hot and dry ignite much more easily than particles which e.g. are cold and wet.

The adapting of at least one parameter may further comprise setting a temperature and/or energy threshold based on the average temperature and/or energy content for the particles 160 moving along the path 150 of movement from the first position to the second position. The average temperature and/or energy content for the particles 160 moving along the path 150 of movement from the first position to the second position may e.g. be determined as an average of the signals from the sensor arrangement 120 for the particles 160 moving through its field-of-view.

The average temperature and/or energy content for the particles 160 may fluctuate, e.g. depending on the type of processing the particles 160 have been subjected to, or the amount of particles 160. A certain fluctuation is normal, and therefore it may be desirable to adapt the temperature and/or energy threshold to the average temperature and/or energy content for the particles 160, provided that this stays within a predefined acceptable level of fluctuation.

The adapting of at least one parameter may further comprise setting at least one of an upper and a lower speed threshold based on the speed of movement of the particles 160 moving along the path 150 of movement from the first position to the second position. In this case, signals from particles 160 that move faster than the upper speed threshold and/or slower than the lower speed threshold may be removed. In this way, movements that are much too quick or slow to be particles may be ignored. This may be done e.g. using frequency filters.

Instead of just determining a risk level for particles 160 moving through the field-of-view of the sensor arrangement 120, the temperature of the particles 160 moving through the field-of-view of the sensor arrangement 120 may also be determined. This enables at least one processing device 180 to determine how close the temperature of the particles 160 is to the ignition temperature for the particle type, and thus enables a very accurate determination of the risk level. If the temperature of the particles 160 is far below the ignition temperature for the particle type, the risk is low even if the energy content of the particles 160 would be very high, but if the temperature of the particles 160 is above the ignition temperature for the particle type, even relatively low energy content may become dangerous.

The at least one processing device 180 may be arranged to determine the rate of change in the temperature of particles 160 moving through the field-of-view of the sensor arrangement 120. Slow temperature changes may e.g. be caused by overloads in the monitored process. This does not necessarily increase the risk of a fire or explosion, but the information about such overloads may e.g. be used to optimize the monitored process.

If the rate of change in the temperature of particles 160 moving through the field-of-view of the sensor arrangement 120 is above a predetermined threshold, the rate of change may be determined to be fast. This may e.g. be caused by pollutions in the system, and thus alarms should preferably be sent in such situations.

Information about temperature trends of particles 160 moving through the field-of-view of the sensor arrangement 120 may thus be sent to at least one operator, and/or to a control system. This information may e.g. be sent as alarms, information type "alarms", alerts, instructions to set flags in the control system, or plain data.

Figure 6:
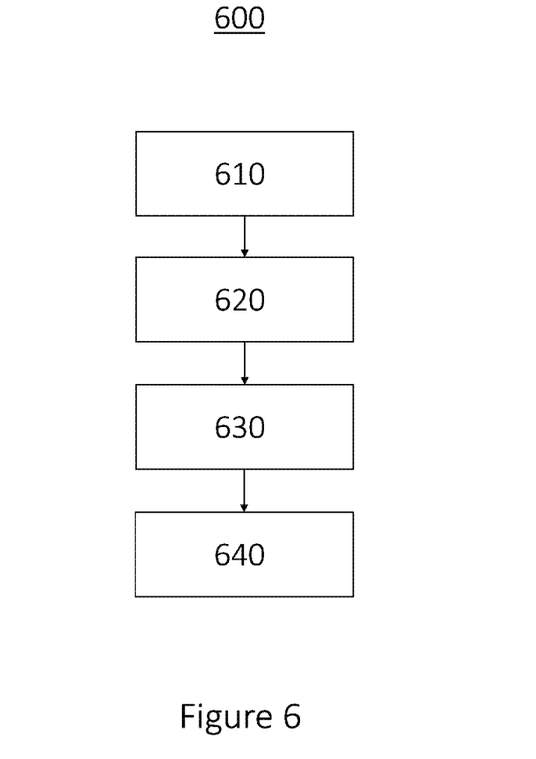
FIG. 6 schematically illustrates a method for determining a risk level for particles moving along a path of movement from a first position to a second position, in accordance with one or more embodiments described herein.

FIG. 6 schematically illustrates a method 600 for determining a risk level for particles 160 moving along a path 150 of movement from a first position to a second position, in accordance with one or more embodiments described herein. The method 600 may comprise:

Step 620: detecting a signal related to the temperature of particles 160 moving through a field-of-view of a sensor arrangement 120, said field-of-view being arranged in the path 150 of movement of the particles 160, the sensor arrangement 120 comprising at least one set of sensing elements 140, each set comprising at least two sensing elements 140 arranged to co-operate with mutually separated sensing zones along the path 150 of movement of the particles 160.

Step 630: forming the signals from the at least one set of sensing elements 140 into at least one pulse train when a particle 160 moves through the field-of-view of the sensor arrangement 120.

Step 640: determining a risk level for the particles 160 moving through the field-of-view of the sensor arrangement 120 based on this at least one pulse train.

Step 610: adapting at least one parameter used in the determination of the risk level based on at least one property of the particles 160 moving along a path 150 of movement from a first position to a second position.

Use of the method 600 allows for accurate determinations of the risk level for particles moving along a path of movement from a first position to a second position.

In embodiments, the at least one property is at least one of:
the particle type of the particles 160, preferably including both particle material and particle size;
purity/pollutions of the particle material;
the amount of particles 160;
the average temperature and/or energy content for the particles 160;
the average moisture content for the particles 160;
the speed of movement of the particles 160; and/or
the type of processing the particles 160 have been subjected to before being moved along the path 150 of movement from the first position to the second position.

These properties may all have an effect on the risk level of the particles.

The adapting 610 may further comprise setting a temperature threshold based on the particle type, and possibly also the amount, of the particles 160 moving along the path 150 of movement from the first position to the second position, and the determining 640 of said risk level may involve determining a temperature relation to said set temperature threshold. The type of a particle is a way of describing different inherent aspects of the particle. The particle type depends on the material of the particle, but also on e.g. the size of the particle. Wood chips are e.g. considered to belong to a different particle type than sawdust, even though the wood chips may come from the same type of wood as the sawdust. The risk level may be different for different particle types. Further, the risk is generally lower when a lot of material moves than when there is a lower amount of particles.

The adapting 610 may further comprise setting a temperature and/or energy threshold based on the average temperature and/or energy content for the particles 160 moving along the path 150 of movement from the first position to the second position, and the determining 640 of said risk level may involve determining a temperature and/or energy relation to said set temperature and/or energy threshold. Particles which already are hot e.g. ignite much more easily than cold particles. The method 600 may then further comprise determining the average temperature and/or energy content for the particles 160 moving along the path 150 of movement from the first position to the second position as an average of the signals from the sensor arrangement 120 for the particles 160 moving through its field-of-view.

The adapting 610 may further comprise setting at least one of an upper and a lower speed threshold based on the speed of movement of the particles 160 moving along the path 150 of movement from the first position to the second position, and the determining 640 of said risk level may involve removing signals from particles 160 that move faster than the upper speed threshold and/or slower than the lower speed threshold. In this way, movements that are much too quick or slow to be particles may be ignored. This may be done e.g. using frequency filters.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. For example, the sensing elements 140 may be any type of sensing elements that are able to individually detect radiation—any number of sensing elements 140 may e.g. be arranged on the same substrate. In a radiation sensor divided into pixels, a sensing element may e.g. be a group of pixels, or even a single pixel. Accordingly, the scope of the invention is defined only by the claims.

The invention claimed is:

1. A system for determining a risk level for particles moving along a path of movement from a first position to a second position, the system comprising:
a sensor arrangement, a field-of-view of which is arranged in the path of movement of the particles to detect a signal related to the temperature of particles moving through said field-of-view, the sensor arrangement comprising at least one set of sensing elements, each set comprising at least two sensing elements arranged to co-operate with mutually separated sensing zones along the path of movement of the particles; and
at least one processing device, which is arranged to:
receive signals from the sensor arrangement;
form signals from the at least one set of sensing elements into at least one pulse train when a particle moves through the field-of-view of the sensor arrangement; and
based on this at least one pulse train, determine a risk level for the particles moving through the field-of-view of the sensor arrangement, wherein the determination of the risk level comprises comparing at least one parameter related to the temperature of the particles, determined by the at least one processing device based on the at least one pulse train, with at least one threshold, wherein the at least one processing device is arranged to adapt at least one threshold used in the determination of the risk level based on at least one property of the particles as the particles move along the path of movement from the first position to the second position.

2. The system according to claim 1, wherein said at least one property of the particles is at least one of:
the particle type of the particles;
purity/pollutions of the particle material;
the amount of particles;
the average temperature and/or energy content for the particles;
the moisture content for the particles;
the speed of movement of the particles; and/or
the type of processing the particles have been subjected to before being moved along the path of movement from the first position to the second position.

3. The system according to claim 2, wherein the at least one processing device is arranged to set a temperature threshold based on the particle type of the particles moving along the path of movement from the first position to the second position, wherein the determination of said risk level involves determining a temperature relation to said set temperature threshold.

4. The system according to claim 3, wherein the at least one processing device is arranged to set said temperature threshold based also on the amount of particles moving along the path of movement from the first position to the second position.

5. The system according to claim 2, wherein the at least one processing device is arranged to set a temperature and/or energy threshold based on the average temperature and/or energy content for the particles moving along the path of movement from the first position to the second position, wherein the determination of said risk level involves determining a temperature and/or energy relation to said set temperature and/or energy threshold.

6. The system according to claim 5, wherein the average temperature and/or energy content for the particles moving along the path of movement from the first position to the second position is determined as an average of the signals from the sensor arrangement for the particles moving through its field-of-view.

7. The system according to claim 2, wherein the at least one processing device is arranged to set at least one of an upper and a lower speed threshold based on the speed of movement of the particles moving along the path of movement from the first position to the second position, wherein the determination of said risk level involves removing signals from particles that move faster than the upper speed threshold and/or slower than the lower speed threshold.

8. A method for determining a risk level for particles moving along a path of movement from a first position to a second position, the method comprising:
detecting a signal related to the temperature of particles moving through a field-of-view of a sensor arrangement, said field-of-view being arranged in the path of movement of the particles, the sensor arrangement comprising at least one set of sensing elements, each set comprising at least two sensing elements arranged to co-operate with mutually separated sensing zones along the path of movement of the particles;
forming the signals from the at least one set of sensing elements into at least one pulse train when a particle moves through the field-of-view of the sensor arrangement; and
determining a risk level for the particles moving through the field-of-view of the sensor arrangement based on this at least one pulse train, wherein the determination of the risk level comprises comparing at least one parameter related to the temperature of the particles, determined by the at least one processing device based on the at least one pulse train, with at least one threshold,
wherein the method further comprises adapting at least one threshold used in the determination of the risk level based on at least one property of the particles as the particles move along the path of movement from the first position to the second position.

9. The method according to claim 8, wherein said at least one property of the particles is at least one of:
the particle type of the particles;
purity/pollutions of the particle material;
the amount of particles;
the average temperature and/or energy content for the particles;
the moisture content for the particles;
the speed of movement of the particles; and/or
the type of processing the particles have been subjected to before being moved along the path of movement from the first position to the second position.

10. The method according to claim 9, wherein the adapting further comprises setting a temperature threshold based on the particle type of the particles moving along the path of movement from the first position to the second position, and wherein the determining of said risk level involves determining a temperature relation to said set temperature threshold.

11. The method according to claim 10, wherein the adapting further comprises setting said temperature threshold based also on the amount of particles moving along the path of movement from the first position to the second position.

12. The method according to claim 9, wherein the adapting further comprises setting a temperature and/or energy threshold based on the average temperature and/or energy content for the particles moving along the path of movement from the first position to the second position, and wherein the determining of said risk level involves determining a temperature and/or energy relation to said set temperature and/or energy threshold.

13. The method according to claim 12, further comprising determining the average temperature and/or energy content for the particles moving along the path of movement from the first position to the second position as an average of the signals from the sensor arrangement for the particles moving through its field-of-view.

14. The method according to claim 9, wherein the adapting further comprises setting at least one of an upper and a lower speed threshold based on the speed of movement of the particles moving along the path of movement from the first position to the second position, and wherein the determining of said risk level involves removing signals from particles that move faster than the upper speed threshold and/or slower than the lower speed threshold.

* * * * *